United States Patent [19]
Ogata et al.

[11] Patent Number: 5,442,616
[45] Date of Patent: Aug. 15, 1995

[54] LIGHT SOURCE UNIT AND METHOD OF ADJUSTING FOR MAXIMIZING FOCUS AND TRACKING ERRORS THEREBY

[75] Inventors: Nobuo Ogata, Tenri; Hideaki Sato, Yamatokoriyama, both of Japan

[73] Assignee: Sharp Kabushiki Kaisha, Osaka, Japan

[21] Appl. No.: 16,456

[22] Filed: Feb. 11, 1993

[30] Foreign Application Priority Data

Feb. 13, 1992 [JP] Japan ................................. 4-026589

[51] Int. Cl.⁶ .............................................. G11B 7/135
[52] U.S. Cl. ................... 369/112; 369/44.14; 369/44.41; 369/109; 369/44.23
[58] Field of Search ...................... 369/112, 109, 44.37, 369/44.14, 44.32, 44.23, 44.38, 122, 44.12, 44.41

[56] References Cited

U.S. PATENT DOCUMENTS

| | | | |
|---|---|---|---|
| 5,060,212 | 10/1991 | Fujita et al. | 369/44.12 |
| 5,070,488 | 12/1991 | Fukushima et al. | 369/44.12 |
| 5,148,421 | 9/1992 | Satoh et al. | 369/44.23 |
| 5,220,543 | 6/1993 | Kuroda et al. | 369/44.14 |
| 5,270,997 | 12/1993 | Katayama | 369/112 |
| 5,283,771 | 2/1994 | Kadowaki et al. | 369/112 |
| 5,285,062 | 2/1994 | Lee | 369/44.14 |

FOREIGN PATENT DOCUMENTS

0333511 9/1989 European Pat. Off.

OTHER PUBLICATIONS

JEE Journal of Electronic Engineering, Oct. 28, 1991 No. 298 Tokyo, Japan, by Naotaka Ohtsuka and Toshiya Nagahama.

Sharp Technical Journal, vol. 42, pp. 45–52, 1989, "Three Beam CD Optical Pickup Using Holographic Optical Element", Sep. 25, 1989.

*Primary Examiner*—Georgia Y. Epps
*Assistant Examiner*—Kim-Kwok Chu

[57] ABSTRACT

A diffraction element is positionally adjusted on a substitute optical head arrangement while an objective lens is positionally adjusted so as to maximize a total signal calculated in a photodetector, whereby predetermined focusing error signal and tracking error signal are obtained. The thus adjusted diffraction element is adhesively secured on a package housing a light source and a photodetector to form a light source unit. The thus prepared light source unit is positioned on and assembled into an optical head by angularly adjusting the light source and an objective lens on the optical head individually so that both the optical axis of the light, emitted from the light source, and incident on a recording medium and the axis of the objective lens are aligned normal to the recording medium and by coinciding the optical axis of the objective lens with the center of intensity distribution of the incident light on the objective lens. This configuration eliminates the necessity of mechanical parts on the optical head for adjusting the diffraction element and the necessity of a space for the adjustment, so that it is possible to promote the optical head small and light-weighted. In addition, by effecting the optical adjustment when the light source unit is assembled into the optical head, error signals can be adjusted. Therefore, the adjustment step can be omitted.

5 Claims, 10 Drawing Sheets

TRACKING DIRECTION

LIGHT SOURCE UNIT AND METHOD OF ADJUSTING FOR MAXIMIZING FOCUS AND TRACKING ERRORS THEREBY

BACKGROUND OF THE INVENTION

1 Field of the Invention

The present invention relates to a light source unit and an optical head equipped therewith, and more specifically, the present invention is directed to the improvement of a light source unit built in with a diffraction element and an optical head equipped with the light source unit.

2 Description of the Related Art

In the art of optical heads for use in optical disc drivers such as compact disc players, etc., there has been developed a technology which could reduce the number of parts in the device by employing a diffraction element (hologram optical element). Moreover, application of this technology to rewritable type optical disc systems for magneto-optical disc has been investigated in order to make the device small and light-weighted and reduce the cost of the device.

Figure 1:
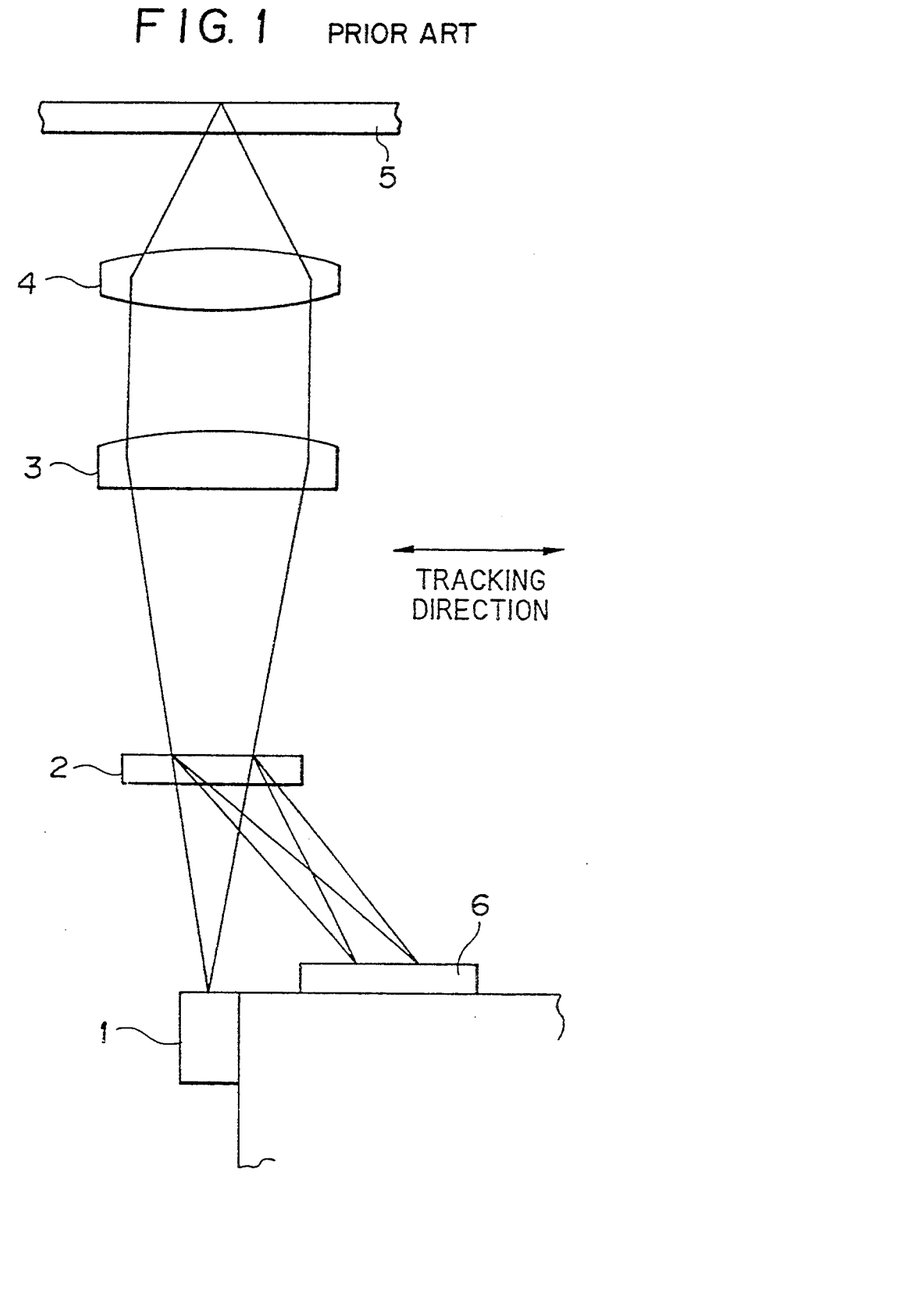
FIG. 1 is a schematic front view of an optical head.

As a prior art example of such an optical head employing a diffraction element in optical system, there has been known an arrangement as shown in FIG. 1 disclosed in an article in "Sharp Technical Journal (vol.42 pp.45–52, 1989)". In FIG. 1, light emitted from a semiconductor laser 1 is diffracted by a diffraction element 2. The zero order diffracted light passes through a collimator lens 3 and the transmitted light is condensed on a recording medium 5 through an objective lens 4. The thus condensed light is reflected on the recording medium 5 and the reflected light therefrom is transmitted through the objective lens 4 and the collimator lens 3, and then diffracted by the diffraction element 2. The first order diffracted light is lead to a photodetector 6 in order to provide a focusing error signal and tracking error signal.

Figure 2:
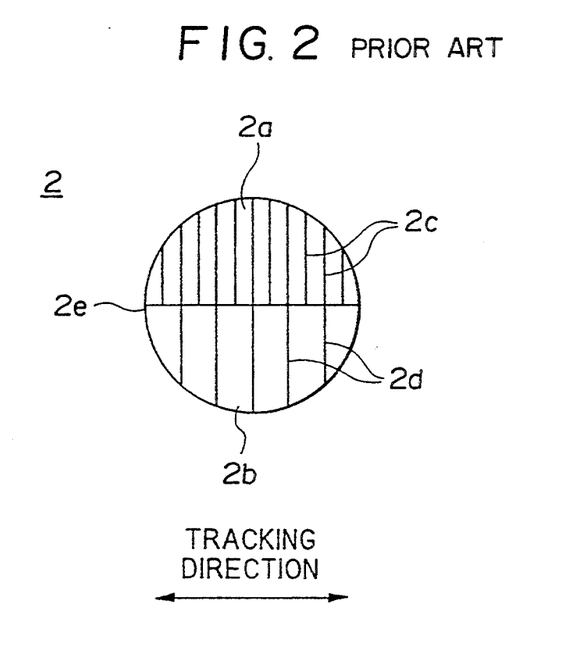
FIG. 2 is a schematic plan view of a diffraction element.
Figure 3A:
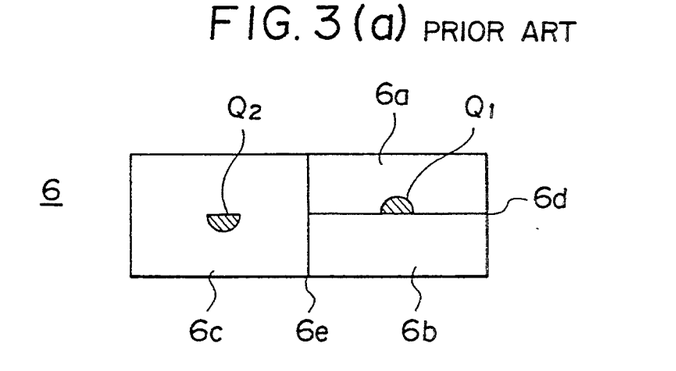
Figure 3B:
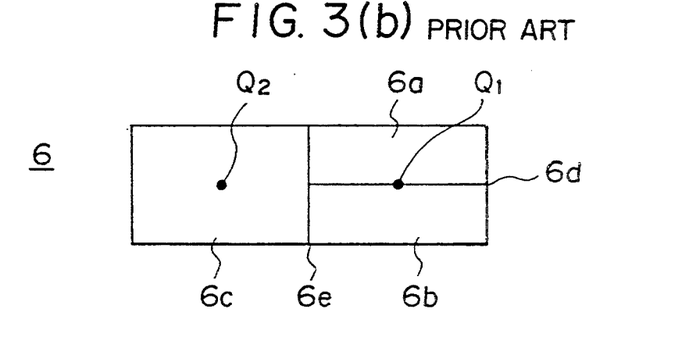
Figure 3C:
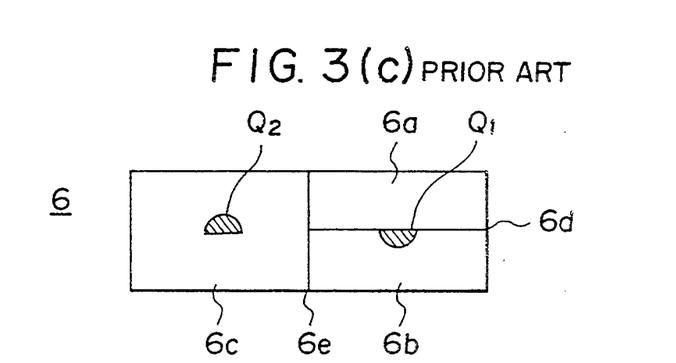

Now referring to FIGS. 2 and 3, the principle of detection of a focusing error signal in the thus constructed optical head will be explained. As shown in FIG. 2, when viewed from a side of the recording medium 5, the diffraction element 2 is constructed of two parts 2a, 2b divided by a parting line 2e. The divided parts 2a, 2b respectively have gratings 2c, 2c and 2d, 2d formed at right angles with the parting line 2e, with different grid pitches from one another. Here the parting line 2e is aligned in the direction of tracks on the recording medium 5. On the other hand, a photodetector 6, as shown in FIG. 3, is divided into three light receiving areas 6a to 6c. In this arrangement, when light beam emitted from the semiconductor laser 1 is in a focalized state on the recording medium 5, as shown in FIG. 3(b), the beam diffracted in the divided part 2a of the diffraction element 2 is condensed to form a spot-like beam image $Q_1$ on a parting line 6d defined between the light receiving areas 6a, 6b in the photodetector 6, whereas the beam diffracted in the divided part 2b is condensed to form a spot-like beam image $Q_2$ on the light receiving area 6c. When the recording medium 5 becomes near to the objective lens 4, diffracted light is focalized at behind the photodetector 6, so that unfocused semi-circular beam images $Q_1$, $Q_2$ are formed on the photodetector 6 as shown in FIG. 3(a). In contrast, when the recording medium 5 becomes far from the objective lens 4, diffracted light is focalized in front of the photodetector 6, so that unfocused beam images $Q_1$, $Q_2$ having semi-circular shapes directed opposite to the above ones are formed on the photodetector 6 as shown in FIG. 3(c). Accordingly, naming output signals obtained from light receiving areas 6a 6c as Sa to Sc, the focusing error signal (FES) can be obtained by calculating FES=Sa −Sb.

Figure 4A:
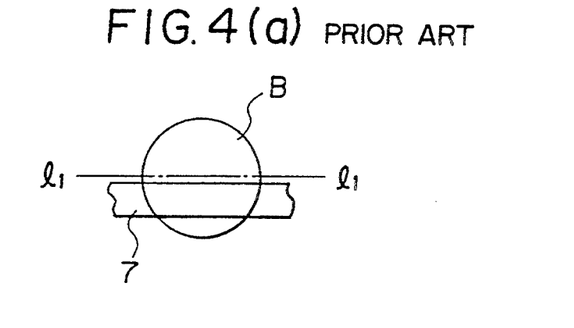
Figure 4B:
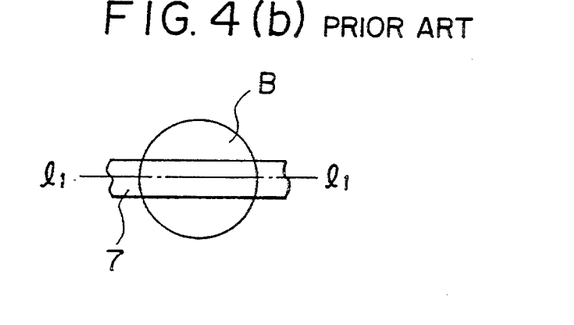
Figure 4C:
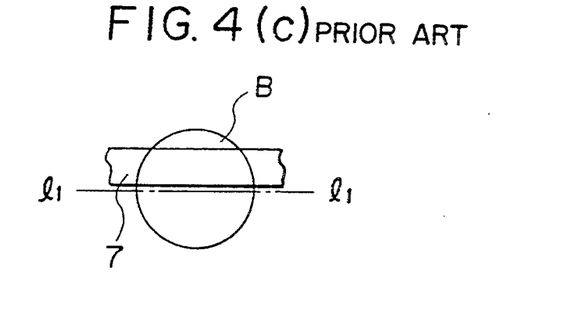
Figure 5A:
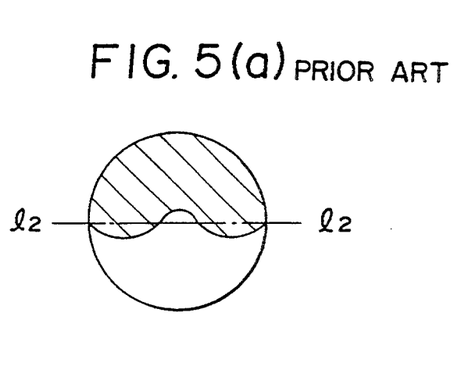
Figure 5B:
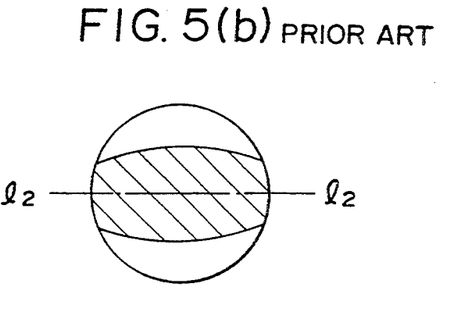
Figure 5C:
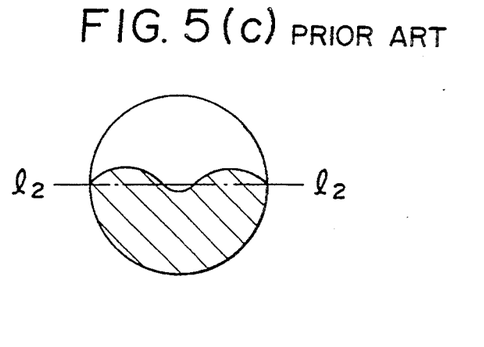

Next, a principle of detection of a tracking error signal will be described with reference to FIGS. 4 and 5. Detection of a tracking error signal is performed using push-pull method. As shown in FIG. 4(b), when a light beam B is irradiated onto the center of a track 7 formed on the recording medium 5 as a guide groove, the intensity distribution of the returning light from the recording medium 5 is symmetric as shown in FIG. 5(b) with respect to a center line $l_2$—$l_2$ corresponding to a center line $l_1$—$l_1$ of the above-mentioned light beam B. Here, it should be noted that area in which intensity is low is hatched in FIGS. 5(a) to 5(c). On the other hand, as shown in FIG. 4(a) or 4(c), when the light beam B is irradiated on a position off the center of the track 7 inward or outward, the intensity distribution of the returning light is asymmetrical with respect to the above-mentioned center line $l_2$—$l_2$ as shown in FIG. 5(a) or (c). By utilizing such effect, alignment of the parting line 2e of the diffraction element 2 with the tracking direction can be carried out and a tracking error signal can be detected by comparing the light intensity of returning light, reflected from the recording medium 5 and diffracted in the divided part 2a, with the light intensity of returning light diffracted in the divided part 2b. Accordingly, naming output signals obtained from light receiving areas 6a to 6c as Sa to Sc, the tracking error signal (TES) can be obtained by calculating TES=Sa+Sb−Sc.

In order to effect exact recording and reproducing of information, the objective lens 4 is driven in both focusing and tracking directions by means of an unillustrated actuator based upon the focusing error signal and tracking error signal, so that the irradiated light beam may be focalized on the recording medium 5 and the condensed light beam can be positioned precisely on the track 7.

Figure 8:
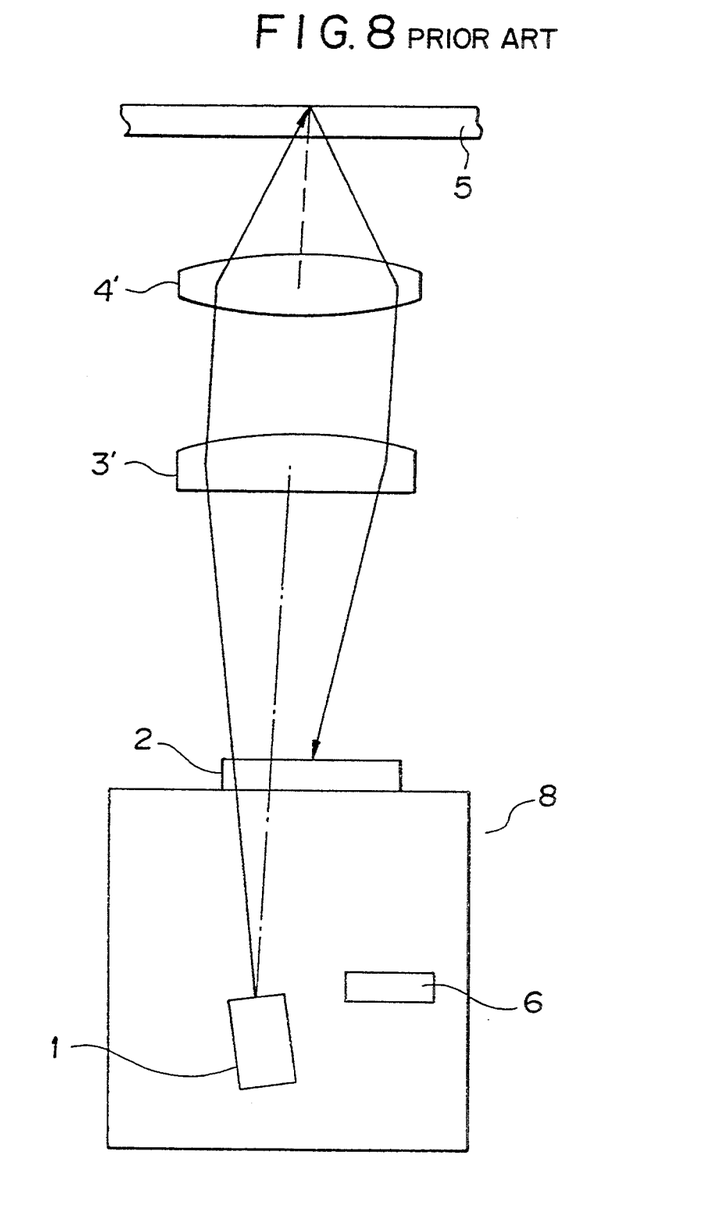
FIG. 8 is an illustration for explaining adjusting position of a diffraction element using a prior art substitute optical head arrangement.

As stated heretofore, in the prior art device, every diffraction element used to be adjusted on its corresponding individual optical head observing the focusing error signal and tracking error signal, but this adjustment process has posed problems that a space should be secured in the optical head for adjusting the diffraction element; mechanical parts for the adjustment are needed; adjusting jig must be complicated; and the diffraction element is hard to secure and adhere. To solve the problems, the following procedures are taken. That is, a light source unit 8 comprising semiconductor laser 1, photodetector 6 and diffraction element 2 is assembled while the diffraction element 2 is adjusted on a substitute optical head arrangement as shown in FIG. 8, which is equipped with the equivalent optical parts as in the optical head. Then, the thus assembled unit 8 is incorporated into an actual optical head.

Figure 6:
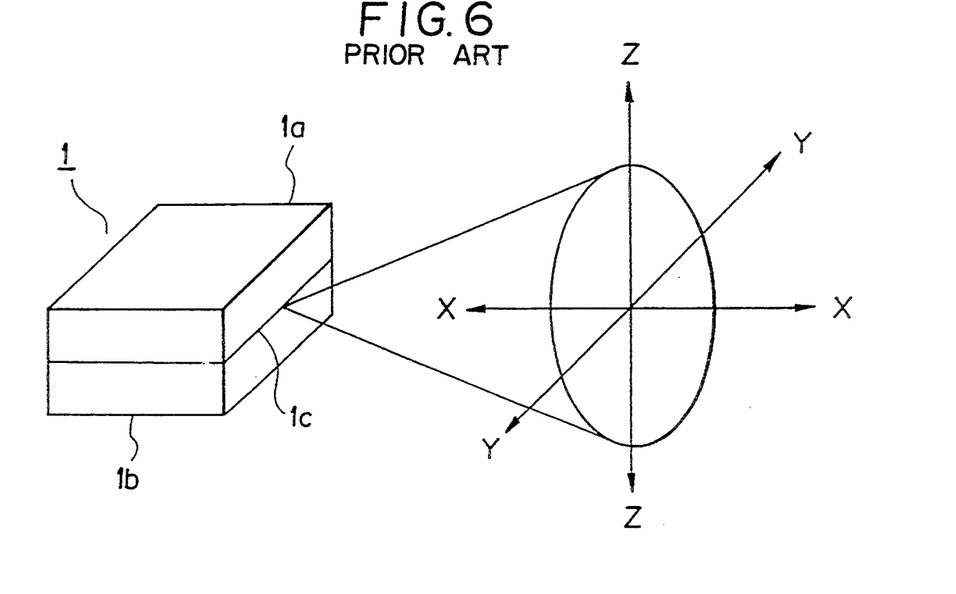
FIG. 6 is an illustration for explaining intensity distribution of the emitted light from a semiconductor laser.
Figure 7:
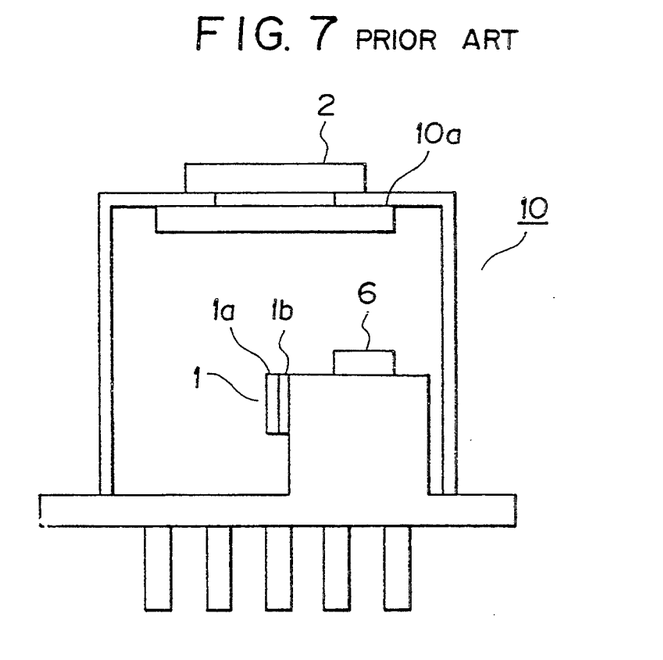
FIG. 7 is a schematic front view showing a semiconductor laser and light source unit.

As the semiconductor laser 1 in the aforementioned optical head, one shown in FIG. 6 is employed generally for a wide commercial use. The semiconductor laser 1 is constructed such that laser chips 1a, 1b are joined together at a junction interface 1c, and therefore light divergent angles differ between Y-axis direction on an XY-plane parallel to the Junction interface 1c and Z-axis direction on an XZ-plane perpendicular to the junction interface 1c. In other words, intensity of light beam emitted from the semiconductor laser has a Gaussian distribution, but extent of divergent angle differs depending upon directions. Specifically, a GaAlAs type semiconductor laser with a wavelength of 780 nm, which is mainly used currently, has full angles at half height (or an angle defined by two points at which intensity of light is half as much as the central intensity) of about 10° in Y-axis direction and about 30° in Z-axis direction. Accordingly, a pattern in a YZ-plane cross section which is perpendicular to the optical axis of the light beam has an elliptic shape having its minor axis on Y-axis and its major axis on Z-axis. The laser chips $1a$, $1b$ and the photodetector 6 are integrally housed in a package 10 as shown in FIG. 7. The package 10 containing the laser chips $1a$, $1b$ and the photodetector 6 is hermetically sealed with a glass window $10a$ so as to protect the inside from the outside air containing humidity, oxygen, etc. The diffraction element 2 is secured adhesively on the outer side of the glass window $10a$ to complete the light source unit 8. A positional displacement and/or deflection of angle occur when the laser chips $1a$, $1b$ are built in.

Accordingly, in the adjustment of an optical head by using the substitute optical head arrangement shown in FIG. 8, the package including the semiconductor laser 1, collimator lens $3'$ and objective lens $4'$ are centered with mechanical precision, but the positional displacement and/or deflection of angle in fitting the laser chips $1a$, $1b$ may occur, so that emission of the laser beam may be displaced. The central optical path in intensity distribution of the emitted laser beam is shown with a solid line. The emitted light beam from the semiconductor laser 1 is converted into a parallel beam through the collimator lens $3'$. The propagating direction of the collimated light is alined with a line (shown with a single chain line in FIG. 8) joined between the point from which the laser beam is emitted and the central point of the collimator lens $3'$. The objective lens $4'$ focalizes the light coming from the collimator lens $3'$ on a point on a line (shown with a broken line in FIG. 8) which is parallel to the collimated beam from the collimator lens $3'$ and passes through the center of the objective lens $4'$. The light incident on the recording medium 5 is reflected in such a direction that suffices the relation that incident angle be equal to reflection angle. The reflected light then enters the objective lens $4'$ once more. The reflected light having passed through the objective lens $4'$ proceeds in a direction parallel with the incident light but opposite under the effect of the lens $4'$. Then, the light is condensed by the collimator lens $3'$ to proceed toward the position of the semiconductor laser 1. As shown in FIG. 8, the center of intensity distribution on the diffraction element 2 for the returning light is largely deviated from that for the outgoing light. The position of the diffraction element 2 is adjusted based on the intensity distribution of the returning light so as to obtain predetermined focusing error signal and tracking error signal.

Figure 9:
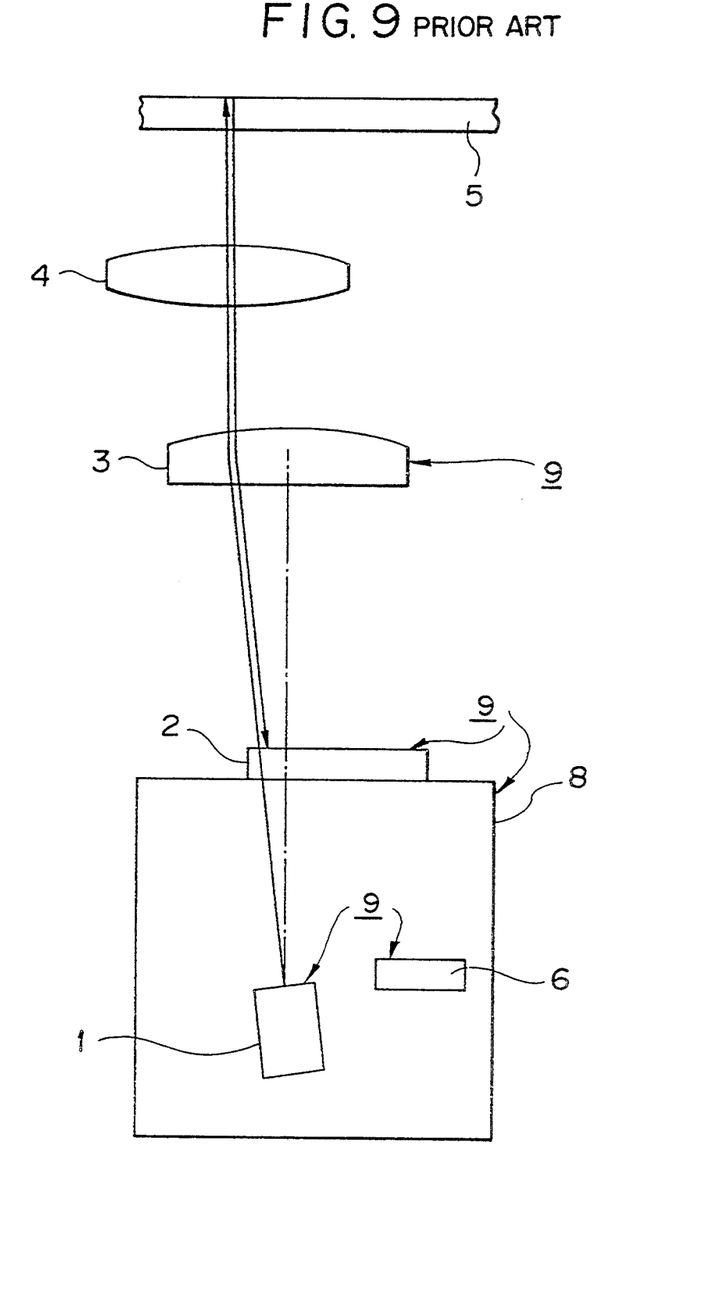
FIG. 9 is an illustration for explaining adjusting method of a prior art optical head.

In an actual optical head, the center of intensity distribution for the incident light onto the objective lens is adjusted such that it coincides with the optical axis of the objective lens 4 in order to improve the spot performance, in order to improve the spot performance, and the incident light on the recording medium 5 be incident perpendicularly thereon. Specifically, as shown in FIG. 9, the semiconductor laser 1 is adjusted and positioned along a direction perpendicular to an optical axis with respect to the collimator lens 3. That is, the optical axis is adjusted so that the propagating beam from the collimator lens 3 may be made incident perpendicularly onto the recording medium. Thereafter, the intensity distribution is adjusted by shifting the integrated luminous block 9 made of both the semiconductor laser 1 and collimator lens 3 in a direction perpendicular to the optical axis. Since the adjustment described above are effected, in assembling the light source unit 8 adjusted on the substitute optical head arrangement into an actual optical head, position of the semiconductor laser 1 is adjusted with respect to the collimator lens 3 so that the parallelized beam outgoing from the collimator lens 3 may be made incident perpendicularly on the recording medium 5 while the integrated luminous block 9 of the semiconductor laser 1 and collimator lens 3 is positionally adjusted with respect to the objective lens 4 so the center of the objective lens be coincident with that of the intensity distribution of the beam. Accordingly, the center of intensity distribution of the outgoing light beam coincides with that of the returning light beam. Nevertheless, since the diffraction element 2 is adjusted with reference to a center of the returning path which is deviated from that of the outgoing path under the influence of the deflection or displacement of emitted light direction due to the fitting position of the laser chips $1a$, $1b$ and/or dispersion of the attached orientation, the error signals observed on the actual optical head differs from those observed on the substitute optical head arrangement. Accordingly, offset of the focusing error signal and tracking error signal may or does occur.

The degree of the offset depends upon the deflection of the emitted light orientation, and is influenced by the numerical aperture of the collimator lens 3, or the utilizing range of the intensity distribution of the emitted laser beam. For example, the numerical aperture of a collimator lens 3 used in an optical head for compact disc is as small as 0.1, so this allows use of only central portion, which can be assumed uniform, of the emitted laser beam having anisotropic intensity distribution, so that the displacement of the intensity distribution described above may be less influential. In contrast, for instance, an optical head for use in that rewritable type optical disc system for magneto-optical disc which is capable not only of reproducing signals but also recording information, need be increased in light utilization in order to obtain light intensity enough to perform recording. For this reason the numerical aperture of the collimator lens is set to be as large as 0.3 to 0.4, therefore, almost full range of the intensity distribution of the emitted laser beam must be utilized. This makes large the influence of the displacement of the intensity distribution.

SUMMARY OF THE INVENTION

It is therefore an object of the present invention to provide a light source unit and an optical head equipped therewith wherein the light source unit is assembled using a substitute optical head arrangement having an optically adjusted objective lens, and in assembling the position of a diffraction element can be adjusted while, by monitoring the total signal obtained from the light source unit, the position of the objective lens is controlled so as to maximize the total signal.

The above object can be achieved by features as follows.

That is, a light source unit in accordance with the present invention is integrally constructed of a package comprising a light source and a light receiving element housed therein and a diffraction element adjusted and adhesively secured on the package, and is characterized in that the diffraction element is positionally adjusted on a substitute optical head arrangement having a collimator lens and an objective lens while the objective lens is positionally adjusted so as to maximize a total signal calculated by adding up all the light amounts received by respective light receiving areas of the light receiving element, whereby predetermined focusing error signal and tracking error signal are obtained.

An optical head in accordance with the present invention employs the above-stated light source unit as a light source which is assembled therein by angularly adjusting the light source and an objective lens individually so that both the optical axis of the light, emitted from the light source and incident on a recording medium, and the axis of the objective lens are aligned normal to the recording medium and by positioning the light source so as to coincide the optical axis of the objective lens with the center of intensity distribution of the incident light on the objective lens.

Another optical head comprises a light source; a collimator lens for converting light emitted from the light source into a parallel beam; an objective lens for condensing the parallel beam on a recording medium and leading the light reflected on and from the recording medium to a diffraction element; a light receiving element for detecting a focusing error signal and tracking error signal based on the reflected light, the light receiving element which is divided into at least two light receiving areas; and a diffraction element disposed at a point on the optical path between the light source and the recording medium for leading the reflected light from the recording medium to the light receiving element; wherein a luminous block of the light source and the collimator lens integrated, or the objective lens is supported movable in directions perpendicular to the optical axis, and the position of the objective lens is adjusted relative to the intensity distribution of the light incident on the objective lens by positioning the luminous block or the objective lens; and is characterized in that the diffraction element is positionally adjusted while the objective lens is positionally adjusted so as to maximize a total signal calculated by adding up all the, light amounts received by respective light receiving areas of the light receiving element, whereby predetermined focusing error signal and tracking error signal are obtained.

In accordance with the above optical head, in a substitute optical head comprising a light source, a collimator lens for converting light emitted from the light source into a parallel beam, an objective lens for condensing the parallel beam on a recording medium and leading the light reflected on and from the recording medium to a diffraction element, a light receiving element for detecting a focusing error signal and tracking error signal based on the reflected light, the light receiving element which is divided into at least two light receiving areas, and a diffraction element disposed at a point on the optical path between the light source and the recording medium for leading the reflected light from the recording medium to the light receiving element; a luminous block of the light source and the collimator lens integrated, or the objective lens is shifted on directions perpendicular to the optical axis. The diffraction element is positionally adjusted while the objective lens is positionally adjusted so as to maximize a total signal calculated by adding up all the light amounts received by respective light receiving areas of the light receiving element, whereby predetermined focusing error signal and tracking error signal are obtained. The thus positionally adjusted diffraction element is adhesively secured on the package having the light source and light receiving element housed to complete a light source unit. The light source unit is positionally adjusted and assembled into the optical head by angularly adjusting the light source and the objective lens on the optical head individually so that both the optical axis of the light, emitted from the light source and incident on a recording medium, and the axis of the objective lens are aligned normal to the recording medium and by coinciding the optical axis of the objective lens with the center of intensity distribution of the incident light on the objective lens. As a result, the same focusing error signal and tracking error signal which would be obtained in the actual optical head can be obtained in the substitute optical head arrangement.

BRIEF DESCRIPTION OF THE DRAWINGS

FIG. 3(a, b, c) is a schematic plan view of a photodetector;

FIG. 4(a, b, c) is an illustration showing positional relations between a track and light beam:

FIG. 5(a, b, c) is an illustration showing intensity distributions of returning light corresponding to the positional relation shown in FIG. 4;

DESCRIPTION OF THE PREFERRED EMBODIMENTS

Embodiments of the present invention will hereinafter be described with reference to the accompanied drawings.

Figure 10:
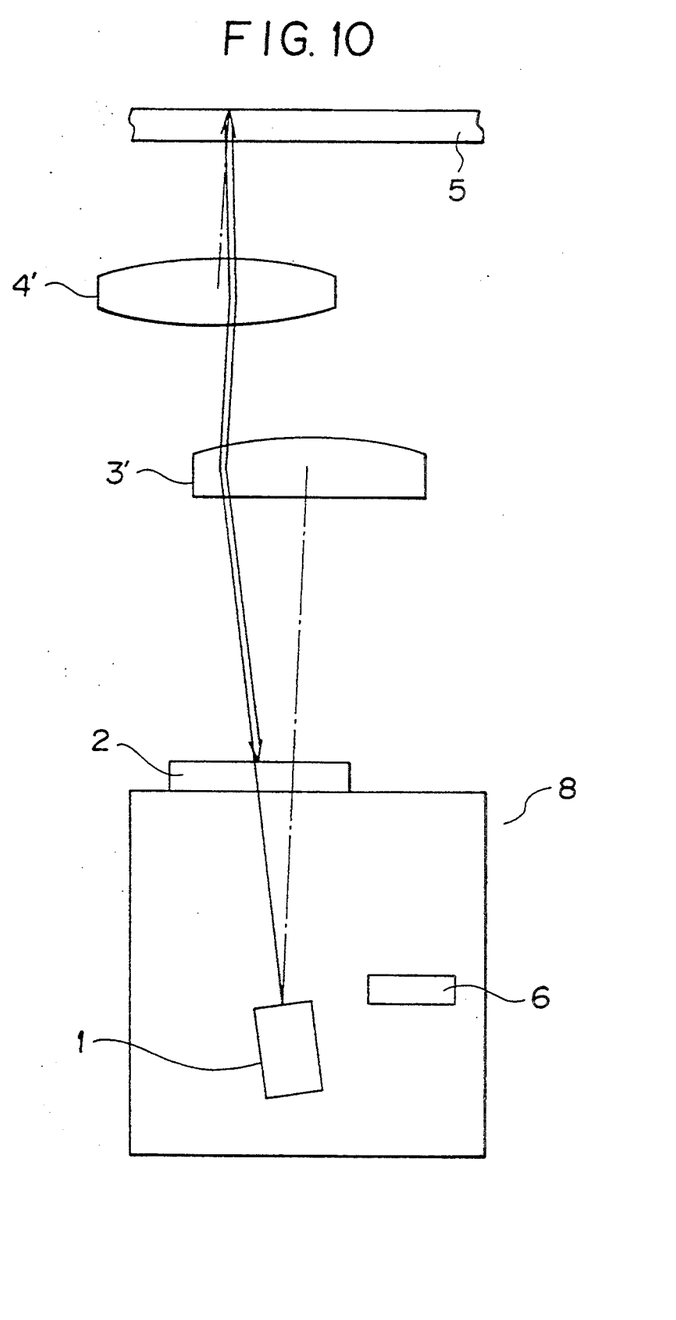
FIG. 10 is an illustration for explaining adjusting position of a diffraction element using a substitute optical head arrangement of the present invention.

Referring to FIG. 10, explanation will be made as to adjustment of a light source unit on a substitute optical head arrangement. Hereinafter, optical elements arranged on the substitute optical head arrangement will be denoted by dashed numeral in order to distinguish them from optical parts for use in an actual optical head. In FIG. 10, light emitted from a semiconductor laser 1 is diffracted by a diffraction element 2. The zero order diffracted light passes through a collimator lens 3' and the transmitted light is condensed on a recording medium 5 through an objective lens 4'. The thus condensed light is reflected on the recording medium 5 and the reflected light therefrom is transmitted through the objective lens 4' and the collimator lens 3', and then diffracted by the diffraction element 2. The first order diffracted light is lead to a photodetector 6 in order to provide a focusing error signal and tracking error signal. As regards positional adjustment of the diffraction element 2, referring to an example of adjustment as to tracking error signal by the aforementioned push-pull method, the diffraction element 2 must be positioned such that the returning light from the recording medium 5 may be split symmetrically with respect to the center line corresponding to the center line of the track and the thus split light may be condensed onto respective light receiving areas of the photodetector 6. In the embodiment, the semiconductor laser 1 is aligned and centered with the collimator lens 3' with only mechanical precision. Therefore, the beam emitted from the semiconductor laser 1 and converted into a parallel beam through the collimator lens 3' propagates in a direction parallel to a line (shown with a single chain line in FIG. 10) joined between the point from which the laser beam is emitted and the central point of the collimator lens 3'. In the positional adjustment of the diffraction element 2, the position of the objective lens 4' is adjusted such as to maximize a total signal obtained by adding up all the light amounts accepted by respective light receiving areas of the photo-receiving element 6. With this adjustment, the objective lens 4' can be positioned such that the central portion of intensity distribution of the light beam is transmitted through the collimator lens 3' and is made incident perpendicularly on the recording medium 5. As the central portion of intensity distribution of the light beam is reflected in such a direction that incident angle be equal to reflection angle, when the light is incident perpendicularly on the recording medium 5, the reflected light proceeds in the same course with the incident light, passing through the objective lens 4' and collimator lens 3' once more toward the point from where the laser beam is emitted. The returning light is diffracted by the diffraction element 2, and the first order diffracted light is introduced to the photodetector 6. The diffraction element 2 is divided into a two part by a parting line oriented in the tracking direction. The returning light entering the divided areas is diffracted to be condensed onto two receiving areas of the photodetector 6. At this point, the diffraction element 2 is positioned such that the parting line of the diffraction element 2 coincides with the center line of intensity distribution of the returning light. This adjustment allows the tracking error signal to be free from off-set. In this situation, the diffraction element 2 is adhesively secured on a cap of the package in which the semiconductor laser 1 is housed together with the photodetector 6, to thereby complete a light source unit 8.

Figure 11:
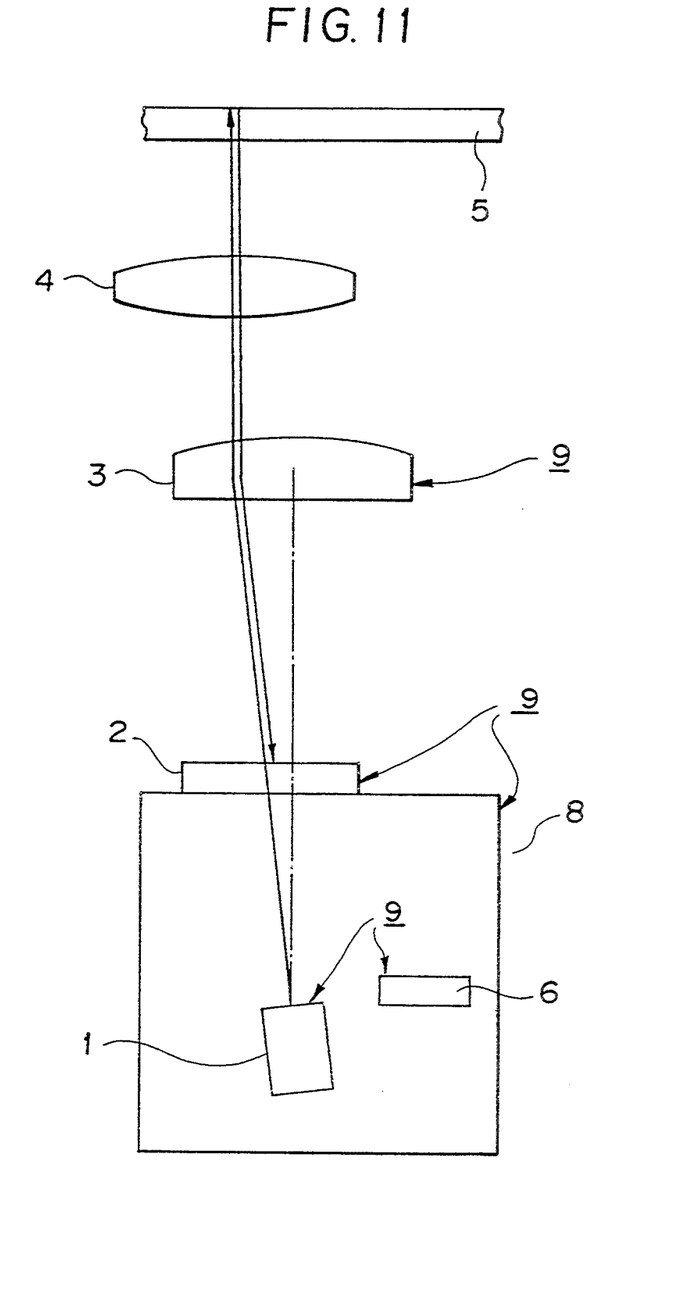
FIG. 11 is an illustration for explaining adjusting of an optical head of the present invention.

The thus adjusted light source unit 8 is assembled into an actual optical head. This adjustment will be explained with reference to FIG. 11. In the actual optical head, the adjustment is carried out such that the optical axis of the objective lens 4 is made coincident with the center of intensity distribution of the incident light onto the objective lens in order to improve the spot performance, while the incident light on the recording medium 5 is made incident perpendicularly thereon. Specifically, the semiconductor laser 1 is adjusted and positioned along directions perpendicular to an optical axis with respect to the collimator lens 3, and the optical axis is adjusted so that the propagating beam from the collimator lens 3 may be made incident perpendicularly onto the recording medium 5. Thereafter, the intensity distribution is adjusted by shifting an integrated luminous block 9 made of both the semiconductor laser 1 and collimator lens 3 in directions perpendicular to the optical axis. Since the adjustment described above are effected, in assembling the light source unit 8 adjusted on the substitute optical head arrangement into an actual optical head, position of the semiconductor laser 1 is adjusted with respect to the collimator lens 3 so that the parallelized beam outgoing from the collimator lens 3 may be made incident perpendicularly on the recording medium 5 while the integrated luminous block 9 of the semiconductor laser 1 and collimator lens 3 is positionally adjusted with respect to the objective lens 4 so that the center of the objective lens may be coincident with that of the intensity distribution of the beam. Accordingly, the center of intensity distribution of the outgoing light beam coincides with that of the returning light beam. Here, since the diffraction element 2 is adjusted with reference to a coinciding center of intensity distribution of the Going and returning light paths, error signals observed on the substitute optical head arrangement correspond to those for the actual optical head.

In the above embodiment, explanation has been made on a case where the diffraction element 2 is adjusted on the substitute optical head arrangement while the position of the objective lens 4' is being adjusted so as to maximize the total signal of the photodetector 6. The same result can be obtained basically if the adjustment of the diffraction element 2 is effected while, with the position of the objective lens 4' being fixed, the other optical elements (semiconductor laser 1, diffraction element 2, photodetector 6) are positionally adjusted as an integrated structure so as to maximize the total signal of the photodetector 6. In addition, in the above description, only the offset of the tracking error signal caused by the difference of intensity distribution of light was taken into account, but as regards the offset of the focusing error signal, it is possible, by the same adjustment process, to coincide the error signal observed on the substitute optical head arrangement with that observed on the actual optical head.

As has been described heretofore, in accordance with the optical head of the present invention, an light source unit having a light source, a photodetector, and a diffraction element integrated is adjusted on the substitute optical head arrangement and then is assembled into an actual optical head. This eliminates necessity for securing the space on the optical head for adjustment of the diffraction element and providing mechanical parts for the adjustment. Therefore, a variety of design of the housing configuration of the optical head is widen, so that it is possible to make the optical head smaller and more light-weighted. Moreover, in assembling the integrated light source unit having a light source, a photodetector and a diffraction element into an optical head, the optical head is optically adjusted so as to optimize the spot performance. As a result, the error signals are automatically adjusted so that it is possible to omit an adjusting step of the error signals.

What is claimed is:
1. A light source unit which is utilized together with;
  a collimator lens and an objective lens;
  means for producing a signal for focusing and tracking which is calculated by adding up all amounts of light received by respective light receiving areas of a light receiving element;
  means for adjusting a position of the objective lens, so as to maximize the signal;
  where said light source unit which is integrally constructed of a package comprising;

a light source of an optical head and the light receiving element housed therein with a diffraction element which is adhesively secured on said package wherein predetermined focusing error signal and tracking error signal are obtained.

2. A method for predetermining and obtaining focus and tracking error signals in an optical head that includes a light source unit which is utilized together with a collimator lens and an objective lens;

means for adjusting a position of the objective lens, so as to maximize a signal for focussing and tracking, which signal is calculated by adding up all amounts of light received by respective light receiving areas of a light receiving element;

where said light source unit which is integrally constructed of a package comprising;

a light source of an optical head and the light receiving element housed therein with a diffraction element which is adhesively secured on said package, the method comprising the steps of:

(a) angularly adjusting individually the light source and the objective lens so that both an optical axis of light from the light source which is incident to a recording medium, and an axis of the objective lens is aligned normal to the recording medium; and (b) positioning the light source so that it coincides with the objective lens optical axis with the center of intensity distribution of incident light on the objective lens.

3. A method for obtaining a predetermined focus and tracking error signal in an optical head that includes
a light source;
a collimator lens converting light emitted from said light source into a parallel beam;
an objective lens which is supported for movement in a direction perpendicular to an optical axis for condensing the parallel beam on a recording medium and leading the light reflected on and from the recording medium to a diffraction element;
a light receiving element for detecting a focusing error signal and tracking error signal based on the reflected light, said light receiving element is divided into at least two light receiving areas; and
a diffraction element disposed at a point on the optical path between said light source and the recording medium for leading the reflected light from the recording medium to said light receiving element, the method comprising the steps of:

(a) providing an integrated luminous block containing said light source and said collimator lens, (b) moving the luminous block and objective lens relative to each other, so that the objective lens is adjusted relative to the intensity distribution of light incident on the objective lens, (c) moving the diffraction element while said luminous block and objective lens are moved relative to each other so as to maximize a signal for focussing and tracking which is calculated by adding up all the light amounts received by respective light receiving areas of said light receiving element; and (d) further adjusting a position of the diffraction element precisely so as to obtain the predetermined focus error signal and tracking error signal.

4. The method of claim 3, wherein said relative movement is performed by moving the luminous block.

5. The method of claim 3, wherein said relative movement is performed by moving the objective lens.

* * * * *